United States Patent [19]

Upton

[11] 4,071,743
[45] Jan. 31, 1978

[54] DIGITAL SCALE CONVERTER

[75] Inventor: Richard G. Upton, Oak Ridge, Tenn.

[73] Assignee: The United States of America as represented by the United States Department of Energy, Washington, D.C.

[21] Appl. No.: 766,277

[22] Filed: Feb. 7, 1977

[51] Int. Cl.² ............................................. G06M 3/02
[52] U.S. Cl. ........................... 235/92 CV; 235/92 PE; 235/92 CC; 235/92 MT; 235/92 R; 235/310
[58] Field of Search ........ 235/92 CC, 92 CV, 92 EA, 235/92 PE, 92 BD, 92 MT, 92 DE, 92 DM, 92 EV, 154, 155; 328/46, 48

[56] References Cited

U.S. PATENT DOCUMENTS

| 3,064,889 | 11/1962 | Hupp | 235/92 CC |
| 3,789,390 | 1/1974 | Burkness et al. | 235/155 |
| 3,840,174 | 10/1974 | Craft | 235/92 CC |
| 3,885,134 | 5/1975 | Bergin et al. | 235/92 CC |

Primary Examiner—Joseph M. Thesz
Attorney, Agent, or Firm—Dean E. Carlson; Stephen D. Hamel; David E. Breeden

[57] ABSTRACT

A digital scale converter is provided for binary coded decimal (BCD) conversion. The converter may be programmed to convert a BCD value of a first scale to the equivalent value of a second scale according to a known ratio. The value to be converted is loaded into a first BCD counter and counted down to zero while a second BCD counter registers counts from zero or an offset value depending upon the conversion. Programmable rate multipliers are used to generate pulses at selected rates to the counters for the proper conversion ratio. The value present in the second counter at the time the first counter is counted to the zero count is the equivalent value of the second scale. This value may be read out and displayed on a conventional seven-segment digital display.

3 Claims, 1 Drawing Figure

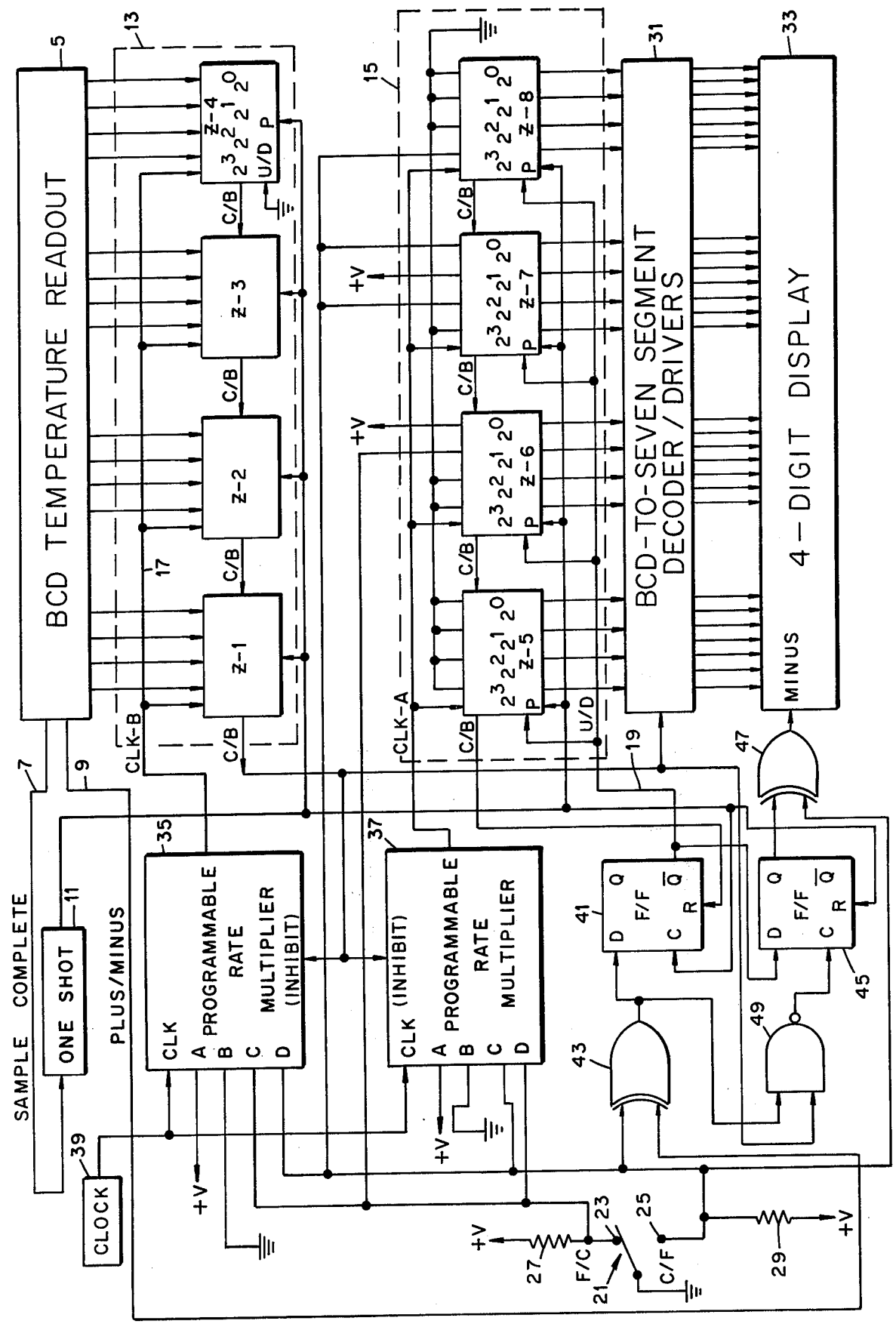

DIGITAL SCALE CONVERTER

BACKGROUND OF THE INVENTION

This invention was made during the course of, or under, a contract with the Energy Research and Development Administration.

This invention relates generally to electronic scale converters and more specifically to a digital scale converter for binary coded decimal (BCD) conversions.

Digital readout indicators, also called digital displays, are indicators that read directly in digital form as opposed to an analog indicator. These devices are in widespread use in numerous scientific and engineering fields. A problem exists, however, in that each device is provided with only a single scale for each particular unit, e.g., inches, centimeters, degrees, radians, etc. Conversion to another scale is accomplished by referring to a conversion chart or performing the necessary conversion calculations.

One of the most common applications where the conversion from one scale to another is necessary is measuring temperature. Many of the temperature indicators in use today are digital indicators, and each is dedicated to displaying temperature in only a single temperature scale, e.g., Centigrade of Fahrenheit.

Thus, there is a need for a digital scale converter which may be readily employed to convert various values of a first scale to equivalent values of a second scale to thereby eliminate the laborious task of converting values such as temperature from one scale to another.

SUMMARY OF THE INVENTION

In view of the above need, it is an object of this invention to provide a digital scale converter for converting binary coded decimal values of a first scale to the equivalent values of a second scale according to a known conversion ratio.

A further object of this invention is to provide a digital scale converter as set forth in the above object further including means for selecting offset values necessary in obtaining specific scale conversions.

Broadly, the invention lies in a digital scale converter for converting a BCD value of a first scale to the equivalent value of a second scale according to a known ratio X/Y, wherein a first counter is loaded with the first scale value and this value is counted to zero at a count pulse rate B while a second counter registers counts at a count pulse rate A, so that the ratio of the pulse rates A to B is equal to the ratio of X to Y. Programmable pulse generators are provided to generate the count pulses at the selected ratio rates. The circuit responds to a zero count output of the first counter for stopping the counting action and reading the count value registered by the second counter as the second scale value. This value may be recorded in various means, as by displaying in a conventional digital display device.

Other objects and many of the attendant advantages of the present invention will be obvious to those skilled in the art from the following detailed description taken in conjunction with the drawing wherein the single FIGURE is a logic diagram of a digital scale converter according to the present invention for selectively converting either temperature values to Fahrenheit temperature values or Fahrenheit values to Centigrade values.

DETAILED DESCRIPTION

Referring now to the drawing, the invention will be illustrated as applicable for digital conversion of binary coded decimal (BCD) temperature values, and it will be obvious to those skilled in the art that various conversions may be made with a similar device provided with means for programming the proper conversion count pulse ratios and offset values, if necessary, to perform the desired conversion.

Although the system could be used with temperature measuring instruments which have an analog output, the device finds its utility primarily with conversions in electronic measuring devices, such as temperature instruments which already provide a BCD readout, such as the BCD temperature readout terminal 5 illustrated in the drawing. The terminal connector 5 is common to or may be wired into various commercially available temperature indicating instruments, such as the Digital Thermocouple Indicator, Model DS-350, supplied by Doric Scientific Corporation, San Diego, California.

Along with the BCD readout, a sample complete logic line 7 is provided and a plus/minus logic line 9 is provided. Once the temperature sample is complete, the sample complete line is activated and the proper logic level is provided on line 9 to indicate whether the value is a plus or a minus temperature value.

The sample complete line 7 is connected to the input of a one-shot 11 which generates a reset pulse at the time the conversion is to begin. The reset pulse output of one-shot 11 is applied to the preset input of a first BCD counter 13 and a second BCD counter 15. The BCD counters 13 and 15 may be made up of conventional decade counters wired together in a conventional manner to produce a four-digit counter arrangement as illustrated here. Although the counters may have various numbers of digits depending upon the magnitude of the values to be converted, the four-digit counter will be used in this example to fully illustrate the invention and minimize the complication of the drawing. The counter 13 segments Z-1 through Z-4 are connected in a conventional manner to accept the BCD value from the readout 5 by parallel loading when the reset pulse from the one-shot 11 is applied to the preset input P of each of the counter segments Z-1 through Z-4. In this arrangement, decade Z-4 is the tenths decade, Z-3 is the units decade, Z-2 is the tens decade, and Z-1 is the hundreds decade. The counter 13 is connected as a down counter by connecting the UP/DOWN control input to ground, as shown in the detailed illustration with counter segment Z-4. Clock pulses according to the pulse rate B (CLK B) are provided by means of a clock line 17 connected to the clock input of each of the segments Z-1 through Z-4. Each counter segment has a carry/borrow (C/B) output which is connected to the C/B input of the next most significant digit counter. The C/B output of the counter Z-1 is a control output to indicate that the value initially preset into the counter 13 has been counted to zero, a zero count indicator output. The C/B output of Z-1 is normally at the "1" logic level and on the count following the zero count the counter switches the Z-1 C/B output to the "0" logic level, which will be referred to herein as the zero count output.

The counter 15 is composed of similar decade counter segments Z-5 through Z-8. This counter differs from the function of counter 13 in that for some conversions the counter must count up and for other conversions the counter must first count down, as will be explained hereinbelow. Therefore, the UP/DOWN control input U/D is connected to an UP/DOWN control line 19. The count preset inputs to the counter 15 segments Z-5 through Z-8 are programmed by means of a switching arrangement 21. Thus, counter 15 is an UP/DOWN counter which is initially loaded with an offset, i.e., 32 when degrees C is being converted to degrees F, and the counter 15 is counted in the upward direction or 17.8 if degrees F is being converted to degrees C, or the counter is initially counted down toward zero. If the count reaches zero the direction is changed to count up, as will be explained hereinbelow.

Switch 21 is a single pole-double throw switch having its common terminal connected to ground potential while its selectable terminals 23 and 25 are connected to a positive voltage source ($+V$) through resistors 27 and 29, respectively. Terminal 23 of switch 21 is connected to the $2^1$ input of counter segment Z-6, the tens decade counter. Terminal 25 is connected to the $2^2$ and $2^0$ inputs of counter segment Z-7, the units decade counter, and the $2^3$ input of the tenths decade counter Z-8. The remaining inputs to the counter segments Z-5 through Z-8 are connected to ground potential (logic "0") with the exception of the $2^0$ input of Z-6 and the $2^1$ input of Z-7, which are connected to $+V$ (logic "1"). Thus, when switch 21 is in the position shown, the conversion is from degrees F to degrees C and when the reset pulse from one-shot 11 is applied to the preset inputs of each of the segments Z-5 through Z-8 a $+V$ or logic "1" is applied from terminal 25 of switch 21 to the $2^0$ input of Z-7 and to the $2^3$ input of Z-8. Since the $2^0$ input of Z-6 and the $2^1$ input of Z-7 are always connected to a logic "1" voltage ($+V$) the preset value is 17.8 in BCD form.

To convert degrees C to degrees F, switch 21 is in the alternate position applying ground to terminal 25 and logic "1" voltage to terminal 23 of switch 21. When the presets are activated, the offset value loaded into counter 15 is 32 in BCD form. The BCD outputs of the counter 15 are connected to the corresponding inputs of a conventional BCD-to-seven-segment decoder driver 31 which drives a conventional seven-segment four-digit display 33.

The count rate ratio applied to counters 13 and 15 is provided by first and second programmable rate multipliers 35 and 37 which are driven by a common clock pulse generator 39. Each rate multiplier has an inhibit input which is connected to the C/B or zero count output of counter 13. The rate multipliers 35 and 37 may be programmed by a binary number applied to their A-D inputs corresponding to $2^0$-$2^3$. Depending upon the number applied to the inputs of the rate multiplier, the multiplier will produce that selected number of pulses for every 10 pulses applied to the clock input thereof. This pulse rate generated at the output is applied to the corresponding counter by means of connecting the output of rate multiplier 35 to the count input of counter 13 and the output of multiplier 37 to the count input of counter 15. For the example here, the rate for either multiplier 35 or 37 will be 5 or 9 pulses for every 10 pulses applied to the input. Therefore, the A or the $2^0$ input of each multiplier is connected to the positive voltage source, the D inputs are grounded, the C input of multiplier 35 and the C input of multiplier 37 are connected to terminal 23 of the switch 21. The D input of multiplier 35 and the C input of multiplier 37 are connected to terminal 25 of the switch 21. Therefore, when switch 21 is in the position shown to convert degrees F to degrees C, input C of multiplier 35 and input D of multiplier 37 are connected to ground while input D of multiplier 35 and input C of multiplier 37 are connected to the positive voltage source. Thus, rate multiplier 35 is programmed to produce 9 pulses for every 10 clock pulses applied to the input thereof and multiplier 37 is programmed to produce 5 pulses for every 10 clock pulses applied to the input thereof. When converting degrees C to degrees F, the opposite ratio is provided, such that there are 5 pulses at the output of multiplier 35 for every 10 input pulses and 9 pulses at the output of multiplier 37 for every 10 input clock pulses.

Thus, it will be seen that by switch 21 the operator selects the programs for the rate multipliers 35 and 37 and sets the offset constant which is loaded into the counter 15, depending upon the conversion to be made. With minor modifications to the existing circuit, the switch 21 could be replaced by a rotary switch or a thumbwheel switching arrangement to provide for virtually any conversion factor. The rate multipliers may be programmed to produce any ratio of pulses and any offset value could be preset in counter 15 in this manner.

A directional control flip-flop 41 is provided which determines whether the counter 15 should initially count up or down. Thus, the $\overline{Q}$ output of flip-flop 41 is connected to the UP/DOWN control inputs of each of the modulus Z-5 through Z-8 of counter 15. Flip-flop 41 is a D type flip-flop with a direct reset input R which is connected to the C/B output of counter 15. The clock input (C) is connected to the output of one-shot 11 while the D input is connected to the output of an exclusive OR gate 43. One input of OR gate 43 is connected to terminal 25 of switch 21 while the second input is connected to the plus/minus line 9. For example, if degrees C is being converted to degrees F, and the value to be converted is below 0°, counter 15 must be started at its initial value (32) and count down. If counter 15 crosses 0, the direction must reverse and count up. This function is carried out by resetting flip-flop 41 when the counter 15 reaches the first count past zero count, activating the C/B output of segment Z-5 of counter 15. If the value to be converted is above zero, then the counter must simply start at $+32$ and count up. This selection is made in a manner which will be described in detail hereinbelow.

A further D type flip-flop 45 is provided to determine whether the minus sign in the display should be "On" or "Off" at the end of each conversion. Thus, the Q output of flip-flop 45 is connected to one input of an exclusive OR gate 47 whose output is connected to the minus indicator of the four-digit display 33. The second input of gate 47 is connected to terminal 25 of switch 21. The direct reset input (R) of flip-flop 45 is connected to the output of one-shot 11. The D input of flip-flop 45 is connected to the $\overline{Q}$ output of flip-flop 41 while the C input is connected to the output of a NAND gate 49. One input of NAND gate 49 is connected to the output of gate 43 while the second input of NAND gate 49 is connected to the zero count output of the counter 13. Thus, at the end of each conversion when counter 13 is counted to zero, gate 49 checks the output of OR gate 43 for a minus value conversion and clocks flip-flop 45 appropriately to activate the minus indicator for the display 33 through gate 47.

In order to describe the circuit operation, conversion of a temperature from degrees F to degrees C using the equation $$C = 5/9 \, F - 17.8$$

will be taken as an example. With the function switch 21 in the position as shown, the rate multiplier 35 is instructed to multiply the incoming clock pulses by 0.9, and the rate multiplier 37 is instructed to multiply the clock pulses by 0.5. Also, the UP/DOWN counter 15 is loaded with the offset number 17.8. Upon receiving a start command from the temperature readout 5 on the sample complete line 7, one-shot 11 generates a 500 nanosecond pulse which presets the counter 13 to the degrees F value available at the temperature readout 5 outputs by parallel loading the values into counter 13. The offset value 17.8 is loaded into counter 15 and the conversion is ready to begin. The rate multipliers 35 and 37 are released by removing the inhibit signal generated at the output of counter 13. When the counter 13 is preset to the initial count value, the carry/borrow output is a logic "1" which is applied to the inhibit input of multipliers 35 and 37 and to the release input of the decoder drivers 31. This inhibits the decoder 31 from reading a new value from the counter 15 until the conversion is complete, i.e., the C/B output of counter 13 at the segment Z-1 switches to "0" logic level.

Assuming that the conversion is a positive value, line 9 from the BCD temperature readout 5 will be a logic "0" which is applied to the input of gate 43. Since the other input to gate 43 is a logic "1" the output of gate 43 will be a logic "1" so that when the start pulse is applied by one-shot 11 to the clock input of flip-flop 41, it will set causing the Q output to assume a logic "1". Thus, the $\overline{Q}$ output of flip-flop 41 is a logic "0" instructing counter 15 to count down during the conversion. Once this preliminary switching has taken place simultaneously with the loading of the value to be converted into counter 13 and the loading of the offset value 17.8 into counter 15, counter 13 begins to count down while counter 15 counts down at a rate which is five-ninths the rate of counter 13. Assuming the °F value to be converted is greater than +32°, counter 15 will count down to zero at which time flip-flop 41 is reset causing its $\overline{Q}$ output to assume a logic "1" level, thereby changing the direction of counter 15 to count in the upward direction until the count in counter 13 is reduced to zero. When this occurs, the C/B output at Z-1 goes to "0", inhibiting multipliers 35 and 37 and instructing the decoder driver 31 to decode the count registered by counter 15 and display the count which is the degree C conversion value. To determine if the conversion is a positive conversion, NAND gate 49 checks the output of gate 43 which is "1" causing the output of gate 49 to assume a logic "1" and, since the D input of flip-flop 45 is "1", flip-flop 45 will set causing the Q output to assume a logic "1". Since both inputs to gate 47 at this point are at the logic "1" level, the output will assume a logic "0", indicating a positive value display.

If the conversion results in a negative value of degrees C due to line 9 indicating a negative value or the degrees F value is less than 32°, the minus sign in the display 33 must be activated. If a negative value is being converted, both inputs of OR gate 43 will be "1", thereby causing the output to be "0". At the end of the conversion, when the C/B output counter 13 goes to "0", both inputs to NAND gate 49 will be "0", causing the output to go to "1". This "0" to "1" change in logic level on the C input of flip-flop 45 causes the Q output to assume the same level as the D input which is a logic "0". Thus, one input to gate 47 is "0" while the other input is a "1" causing the output of gate 47 to assume the logic "1" level, lighting the minus indicator on display 33.

If the conversion results in a negative degree C value for a degree F value lower than 32°, counter 15 does not reach the zero count level and flip-flop 41 is not reset. The Q output of flip-flop 45 remains "0" and the output of gate 47 is "1", indicating a minus Centigrade value.

When converting a temperature value from degrees C to degrees F, using the equation $$F = 5/9 \, C + 32$$

the function switch 21 is placed in the alternate position. The rate multiplier 35 is then instructed to multiply the incoming clock pulses by 0.5 and multiplier 37 is instructed to multiply the same clock pulses by 0.9. Also, UP/DOWN counter 15 is loaded with the offset number 32. The counter 13 is loaded with the degrees C value to be converted, counter 15 is instructed to count in the up direction assuming a positive conversion is to take place and the conversion begins with the reset pulse from the output of one-shot 11.

Counter 13 counts down while counter 15 counts up at a rate which is nine-fifths the rate of counter 13. When counter 13 reaches zero, both counters are stopped and the count registered by counter 15 is read out through the driver 31 and onto the display 33. The minus check flip-flop 45 and gate 49 operate in the same manner as described above to generate a "0" logic level at the output of gate 47 for a plus conversion and a "1" logic level signal at the output of gate 47 for a minus indication.

Thus, it will be seen that a digital scale converter has been provided for converting a binary coded decimal value of a first scale to the equivalent value of the second scale according to a known ratio X/Y wherein a first counter is loaded with the value to be converted and counted down at a pulse rate B while a second counter is counting at a pulse rate A wherein the ratio of rate A to rate B is equal to the ratio X/Y. The circuit is readily adaptable to any digital temperature indicator having BCD outputs and can be designed to be moved from one instrument to another, or permanently mounted and dedicated to one instrument. With the technique of using programmable rate multipliers, changes in clock frequency have no effect on the operation and no adjustments are necessary. The circuit is completely digital and a ± 0.1° accuracy is fixed.

As indicated above, the digital converter herein illustrated may be altered to convert any BCD variable with minor modifications. The possibilities include gallons to liters, inches to centimeters, degrees to radians, and numerous other conversions. Thus, it will be obvious to those skilled in the art that various modifications and changes may be made in the illustrated device without departing from the spirit and scope of the present invention as set forth in the following claims attached to and forming a part of this specification.

What is claimed is:

1. A digital scale converter for converting a binary coded decimal (BCD) value of a first scale to the equivalent value of a second scale according to a known ratio X/Y, comprising:

a readout means for registering the first scale value prior to conversion, said readout means having a plus/minus indicator output;

a first BCD counter having inputs for accepting said first scale value from said readout means in response to a reset pulse applied to a preset input thereof, said first counter having a count pulse input and a zero count output;

a second BCD counter having a count pulse input, a preset input and BCD count outputs;

means for generating and applying said reset pulse to said preset inputs of said first and second counters at the beginning of each conversion;

means for selecting an offset BCD value to be loaded into said second counter when said preset pulse is applied to said preset input thereof;

a first programmable pulse rate multiplier having a clock pulse input and programmed to produce count pulses at a rate B according to a selected binary code applied to binary coded inputs thereof and applying the count pulses to said count inputs of said first BCD counter to count said first counter in the down direction at said rate B;

a second programmable pulse rate multiplier having a clock pulse input and programmed to produce count pulses at a rate A according to a selected binary code applied to binary code inputs thereof and applying the count pulses to said count input of said second counter at said rate A during the count interval of said first counter, wherein the ratio of rate A to rate B is equal to said ratio X/Y;

a clock pulse source connected to said clock pulse input of said first and second rate multipliers;

switching means for selecting and applying said binary code to said binary coded inputs of said first and second rate multipliers according to the desired pulse rate ratio A/B;

a bistable switching means having a reset output connected to a count direction control input of said second counter;

gating means responsive to said plus/minus indicator output of said readout means for operating said bistable switching means in response to said reset pulse to switch said second counter to count in the up direction when said offset value is to be added to the converted value and to count in a downward direction when said offset value is to be subtracted from the converted value, said bistable switching means having a direct reset input connected to zero count output of said second counter so that said second counter is switched to count in the up direction when said offset value is counted down to zero during the conversion; and means responsive to the zero count output of said first counter for reading the count pulses registered by said second counter and displaying said second counter registered value as said second scale value when said first counter is counted to zero.

2. The digital scale converter as set forth in claim 1 further including a digital display means connected to count outputs of said second counter for displaying said second scale value in response to said zero count output of said first counter.

3. The digital scale converter as set forth in claim 2 wherein said digital display means includes a minus indicator means including logic circuit means responsive to the output of said gating means and said reset output of said bistable switching means for switching said minus indicator "On" in response to said zero count output of said first counter when said second scale value is a negative value.

* * * * *